United States Patent
Moore et al.

(10) Patent No.: US 9,700,905 B2
(45) Date of Patent: *Jul. 11, 2017

(54) MOBILE CART FOR SPRAY DISPENSING

(71) Applicant: Black Cat, Inc., Philadelphia, PA (US)

(72) Inventors: Richard I. Moore, Blue Bell, PA (US); Augustus Everhardt, Lansdale, PA (US)

(73) Assignee: Black Cat, Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/980,698

(22) Filed: Dec. 28, 2015

(65) Prior Publication Data
US 2016/0129460 A1    May 12, 2016

Related U.S. Application Data

(63) Continuation of application No. 14/596,421, filed on Jan. 14, 2015, now Pat. No. 9,352,763.
(Continued)

(51) Int. Cl.
*B60B 7/02* (2006.01)
*B05B 7/00* (2006.01)
(Continued)

(52) U.S. Cl.
CPC .............. *B05B 7/0093* (2013.01); *B05B 7/02* (2013.01); *B05B 15/002* (2013.01); *B62B 1/16* (2013.01);
(Continued)

(58) Field of Classification Search
None
See application file for complete search history.

(56) References Cited

U.S. PATENT DOCUMENTS 515,273 A    2/1894  Becker
1,815,825 A  7/1931  Bates
(Continued)

FOREIGN PATENT DOCUMENTS

CA    2708632 A1    1/2012

OTHER PUBLICATIONS

Office Action issued Jul. 28, 2016 in U.S. Appl. No. 15/195,359 by Moore.
(Continued)

*Primary Examiner* — J. Allen Shriver, II
*Assistant Examiner* — Hilary L Johns
(74) *Attorney, Agent, or Firm* — Panitch Schwarze Belisario & Nadel LLP

(57) ABSTRACT

A mobile cart includes a cart frame, wheels rotatably attached to the frame and feet projecting from the frame to an underlying support surface. A carrier tray is fixedly secured atop the cart frame, having a generally planar tray base, a front wall extending upwardly from the front end of the tray base and a cavity. A first container, containing a first material, and a second container, containing a second material, are positioned in the cavity. A combination mixer and dispenser is releasably secured to the frame and releasably fluidly coupled to the first and second containers. The cart is tiltable between a generally horizontal position and a generally vertical position. The front wall of the tray is angled from the tray base such that the front wall lies against the support surface in the generally vertical position, stabilizing the cart for container loading and unloading.

11 Claims, 6 Drawing Sheets

Related U.S. Application Data

(60) Provisional application No. 61/927,282, filed on Jan. 14, 2014.

(51) Int. Cl.

| | | |
|---|---|---|
| *B62B 1/18* | (2006.01) | |
| *B05B 7/02* | (2006.01) | |
| *B05B 15/00* | (2006.01) | |
| *B62B 5/00* | (2006.01) | |
| *B62B 1/16* | (2006.01) | |
| *B62B 1/22* | (2006.01) | |
| *B62B 1/26* | (2006.01) | |

(52) U.S. Cl.
CPC ................ *B62B 1/18* (2013.01); *B62B 1/22* (2013.01); *B62B 1/264* (2013.01); *B62B 5/0003* (2013.01); *B62B 2202/10* (2013.01); *B62B 2203/05* (2013.01)

(56) References Cited

U.S. PATENT DOCUMENTS

| | | | |
|---|---|---|---|
| 2,766,063 A | 10/1956 | Greely | |
| 4,981,412 A | 1/1991 | Hawkins | |
| 5,716,183 A | 2/1998 | Gibson et al. | |
| 6,220,526 B1 | 4/2001 | Johnson | |
| 7,178,695 B1 | 2/2007 | Malenfant et al. | |
| 7,438,084 B2* | 10/2008 | Trettin | B25H 3/00 137/355.16 |
| 8,061,889 B2 | 11/2011 | Mattson et al. | |
| 8,113,385 B2 | 2/2012 | Choiniere et al. | |
| 8,132,693 B2 | 3/2012 | Choiniere et al. | |
| 8,167,170 B2 | 5/2012 | Choiniere et al. | |
| 8,342,372 B2* | 1/2013 | Choiniere | B05B 9/007 222/145.5 |
| 8,474,658 B2 | 7/2013 | Choiniere et al. | |
| 8,794,644 B2* | 8/2014 | Chen | B62B 1/22 280/47.12 |
| 2006/0196548 A1 | 9/2006 | Trettin et al. | |
| 2007/0045289 A1* | 3/2007 | Kott | B05B 7/2497 219/543 |
| 2015/0197261 A1 | 7/2015 | Moore et al. | |
| 2015/0314309 A1 | 11/2015 | Abbale | |

OTHER PUBLICATIONS

Office Action issued Dec. 15, 2016 in U.S. Appl. No. 15/195,359, by Hilary Lynn.
Int'l Search Report and Written Opinion issued May 11, 2017 in Int'l Application No. PCT/US2016/068520.

* cited by examiner

MOBILE CART FOR SPRAY DISPENSING

CROSS-REFERENCE TO RELATED APPLICATIONS

This application is a continuation of U.S. patent application Ser. No. 14/596,421, filed Jan. 14, 2015, entitled "Mobile Cart for Spray Dispensing," which claims priority to similarly-titled U.S. Provisional Patent Application No. 61/927,282, filed on Jan. 14, 2014, the entire contents of each of which are hereby incorporated by reference herein.

BACKGROUND OF THE INVENTION

Whether replacing an old roof, re-roofing or installing a new roof, a new roofing layer must replace or be applied atop the previously existing outermost roof layer, or a new roofing layer must be laid down for the first time. Doing so generally requires application of a roofing adhesive, such as, for example, a foam adhesive, prior to laying of the roofing layer, in order to secure the roofing layer in place. Also in the roofing industry, a roof typically requires some form of insulation. Insulation is utilized for several reasons, such as, for example, air infiltration control, moisture control, temperature control, and noise reduction. One form of insulation is spray foam insulation. Spray foam insulation is a mixture of components that form an expanding foam upon mixing that is sprayed onto roof tiles, concrete slabs, or the like.

Roofing adhesive and spray foam insulation are generally sold in either a 5 gallon bag-in-a-box or a 15 gallon drum. The 15 gallon drums are preferred to the 5 gallon bag-in-a-box, both from a cost vantage (price per gallon) and because roofing jobs tend to require a large amount of adhesive and insulation. One drawback of the 15 gallon drum however is that it weighs approximately 150 lbs. Thus, transporting the drums to an upper level, or onto a roof, can be particularly challenging and potentially unsafe. Further, in addition to transporting the drums, accompanying equipment, such as, for example, a dispenser, a spray gun, and an air compressor may also be needed.

The present invention addresses the challenges associated with safely transporting roofing adhesive and spray foam insulation and accompanying equipment. For example, it is desirable to provide a mobile cart than can safely receive, carry and transport the necessary equipment for roofing and insulation.

BRIEF SUMMARY OF THE INVENTION

Briefly stated, one aspect of the present invention is directed to a mobile cart. The mobile cart comprises a cart frame, a pair of wheels rotatably attached to the frame adjacent a front end thereof and a pair of feet spaced rearwardly from the wheels and projecting downwardly from the cart frame for engaging an underlying support surface. A carrier tray is fixedly secured atop, and supported by, the cart frame. The carrier tray has a generally planar tray base, two opposing side walls extending upwardly from the tray base and a front wall extending between the side walls and upwardly from a front end of the tray base. The tray base, side walls and the front wall define a cavity therebetween. A first container containing a first material and a second container containing a second material are positioned in the cavity. A combination mixer and dispenser is releasably secured to the cart frame and releasably fluidly coupled to the first and second containers for mixing and dispensing the first and second materials. The cart is tiltable between a generally horizontal position and a generally vertical position relative to the underlying support surface. The front wall of the carrier tray is angled from the tray base such that the front wall lies against the underlying support surface in the generally vertical position and stabilizes the cart for loading and unloading of the containers. The wheels support the cart above the underlying support surface when the cart is tilted into the generally horizontal position.

Another aspect of the present invention is directed to a mobile cart comprising a cart frame including a bracket comprising a base member, a side member projecting perpendicularly upwardly from the base member, and a central top flange extending perpendicularly from an upper end of the side member and parallel to the base member. The central top flange includes at least one upper aperture and the base member includes a corresponding at least one lower aperture, axially aligned with the respective upper aperture, and at least one detent pin is releasably positioned through the at least one axially aligned upper and lower apertures. The mobile cart further includes a pair of wheels rotatably attached to the frame adjacent a front end thereof and a pair of feet, spaced rearwardly from the wheels, projecting downwardly from the cart frame for engaging an underlying support surface. A carrier tray is fixedly secured atop, and supported by, the cart frame, the carrier tray having a generally planar tray base, two opposing side walls extending upwardly from the tray base and a front wall extending between the side walls and upwardly from a front end of the tray base. The tray base, side walls and the front wall define a cavity therebetween. A first container, containing a first material, and a second container, containing a second material, are positioned in the cavity. A combination mixer and dispenser is releasably fluidly coupled to the first and second containers for mixing and dispensing the first and second materials. A member of the dispenser frame is extendable along the base member of the bracket and the at least one detent pin is releasably positioned through the at least one upper and lower apertures, to releasably secure the dispenser frame member between the at least one detent pin and the side member, thereby releasably securing the combination mixer and dispenser to the cart frame.

Yet another aspect of the present invention is directed to a method of loading a mobile cart comprising the step of tilting the mobile cart into a generally vertical position relative to an underlying support surface. The mobile cart comprises a cart frame, a pair of wheels rotatably attached to the frame adjacent a front end thereof and a pair of feet spaced rearwardly from the wheels and projecting downwardly from the cart frame. A carrier tray is fixedly secured atop, and supported by, the cart frame, the carrier tray having a generally planar tray base, two opposing side walls extending upwardly from the tray base and a front wall extending between the side walls and upwardly from a front end of the tray base. The tray base, side walls and the front wall define a cavity therebetween, the front wall of the carrier tray being angled from the tray base. A combination mixer and dispenser is releasably secured to the cart frame and releasably fluidly coupled to the first and second containers for mixing and dispensing the first and second materials. The method further comprises the steps of engaging the front wall of the carrier tray against the underlying support surface, and, in turn, stabilizing the mobile cart in the generally vertical position the mobile cart; loading a first container, containing a first material, into the cavity; and tilting the mobile cart into a generally horizontal position relative to the underlying support surface, such that the wheels support the cart above the underlying support surface.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings a preferred embodiment of the mobile cart which is presently preferred. It should be understood, however, that the invention is not limited to the precise arrangements and instrumentalities shown. In the drawings.

DETAILED DESCRIPTION OF THE INVENTION

Figure 1:
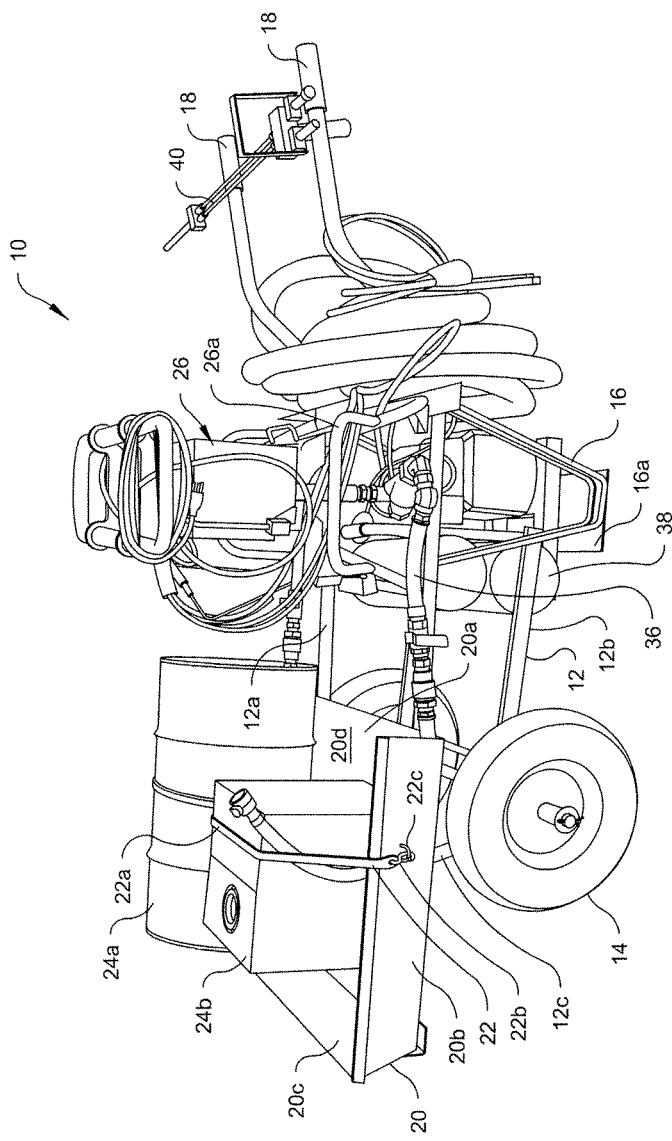
FIG. 1 is a side perspective view of a mobile cart of the present invention in the horizontal position.

Certain terminology is used in the following description for convenience only and is not limiting. The words "right," "left," "lower," and "upper" designate directions in the drawings to which reference is made. The words "inwardly" or "distally" and "outwardly" or "proximally" refer to directions toward and away from, respectively, the geometric center or orientation of the mobile cart and related parts thereof. Unless specifically set forth herein, the terms "a", "an" and "the" are not limited to one element but instead should be read as meaning "at least one". The terminology includes the above-listed words, derivatives thereof and words of similar import.

It should also be understood that the terms "about," "approximately," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to FIGS. 1-6, the present application is directed to a mobile cart, generally designated with reference numeral 10. As shown in FIG. 1, the cart 10 includes a cart frame 12, a pair of wheels 14 rotatably connected to the frame 12 adjacent a front end thereof, and a pair of cart frame feet 16 adjacent a front end thereof projecting downwardly from the cart frame 12 to the underlying ground surface and dimensioned to support the cart 10 in a generally horizontal position. The cart frame 10 also includes a pair of rearwardly extending cart handles 18 for moving and maneuvering the cart 10, and a carrier tray 20.

Figure 2:
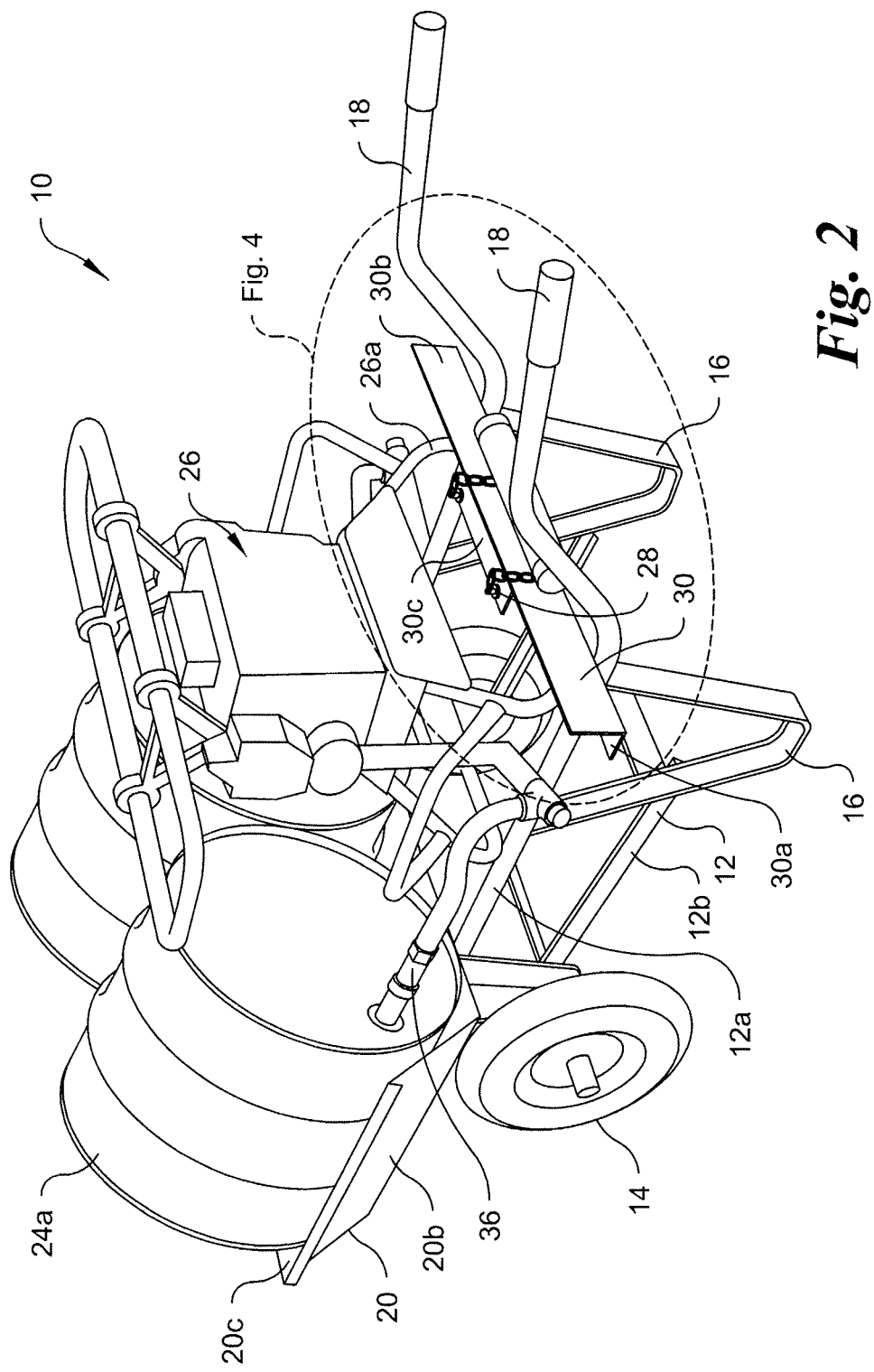
FIG. 2 is a side and rear perspective view of the mobile cart of FIG. 1 in the horizontal position.

Referring now to FIGS. 1 and 2, the cart frame 12 includes a generally rectangular upper cart frame member 12a and a generally rectangular lower cart frame member 12b located beneath the upper cart frame member 12a. That is, the upper and lower cart frame members 12a, 12b constitute substantially parallel left and right side structural bars connected between substantially parallel front and rear structural bars. The upper and lower cart frame members 12a, 12b are spaced apart and fixedly connected together at a front end thereof (the end of the cart 10 supporting the carrier tray 20) via a pair of axial cart frame members 12c extending between respective corners of the rectangular lateral cart frame members 12a, 12b. The wheels 14 are rotatably connected to the front end of the lower cart frame member 12b in a manner well understood by those of ordinary skill in the art.

Figure 3:
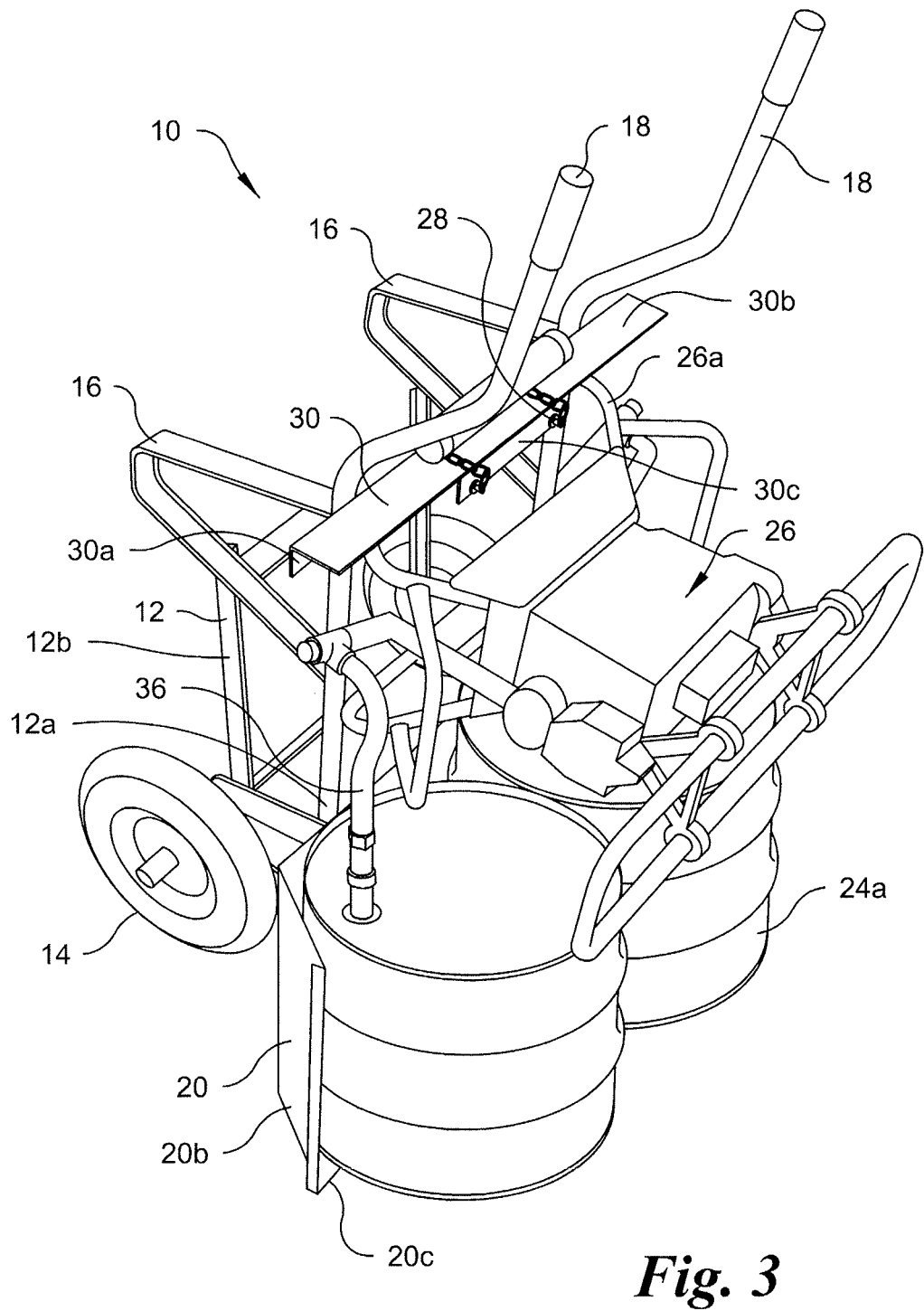
FIG. 3 is a top perspective view of the mobile cart of FIG. 1 in an upright position.

As shown in FIGS. 1 and 2, the cart frame feet 16 extend downwardly from the upper cart frame member 12a to an approximately even elevational level with the bottom of the wheels 14, such that the cart 10 can rest in a substantially horizontal position. The feet 16 are located further rearward along the cart 10 from the wheels 14, adjacent the handles 18. In the illustrated embodiment, the cart frame feet 16 define a generally trapezoidal shape. The upper and longer base of the trapezoidal feet 16 is integrally, i.e., monolithically, formed with, or fixedly secured to, the upper cart frame member 12a. The lower and shorter base of the trapezoidal feet 16 engages the underlying ground surface when the cart 10 is in the horizontal position. In some embodiments, as shown in FIG. 1, and as described further below, the feet 16 include a generally planer support member 16a extending between the lower bases thereof for added stability. The rear of the lower cart frame member 12b left and right side bars are securely connected to the respective feet 16. As shown in FIGS. 2 and 3, the side bars of the upper cart frame member 12a extend rearwardly to form the handles 18.

As shown in FIGS. 1-3, the carrier tray 20 is fixedly secured atop, and supported by, the front end of the upper cart frame 12a. The carrier tray 20 defines a generally planar tray base 20a, two side walls 20b extending upwardly from the sides of the tray base 20a, and a front wall 20c extending upwardly from the front end of the tray base 20a and extending between the side walls 20b. The tray base 20a, and walls 20b, 20c, define a cavity 20d therebetween for supporting materials thereon. As shown in FIG. 1, the side walls 20b and the front wall 20c extend from the tray base 20a at a slightly obtuse angle. However, as should be recognized by those of ordinary skill in the art, the walls 20b, 20c may extend substantially perpendicularly to the tray base 20a. The carrier tray 20 has open upper and rear ends.

The carrier tray 20 is dimensioned to support drums 24a and/or boxes 24b in the cavity 20d, such as, for example, a 15 gallon drum and a 5 gallon bag-in-a-box containing different materials, e.g., adhesive or spray foam insulation. The carrier tray 20 is dimensioned to support two 15 gallon drums 24a, placed side-by-side in the tray 20, as shown in FIGS. 2 and 3. Alternatively, the carrier tray 20 can support one 15 gallon drum 24a and one 5 gallon bag-in-a-box 24b placed side-by-side in the tray 20, as shown in FIG. 1. Alternatively, the carrier tray 20 can support two 5 gallon bag-in-a-boxes 24b placed side-by-side in the tray 20 (not shown). Once loaded onto the carrier tray 20, both a drum 24a or box 24b can be secured in place via securing means 22 (FIG. 1). In the illustrated embodiment, the securing means 22 comprises an elastic band 22a having hooks 22b for strapping around the drum 24a or box 24b and hooking into opposing hooks 22c projecting from the sidewalls 20b (FIG. 1) and from the tray base 20a (not shown). As should be understood, the elastic band 22a is configured to tightly strap around either a box 24b or a drum 24a to substantially prevent it from moving. As also should be understood, the elastic band 22a is configured to not rip or tear from the force imparted thereon by the box 24b or drum 24a. As also should be understood by those of ordinary skill in the art, any of numerous different securing means, currently known or that later become known and capable of performing the function of the securing means as described herein, may be utilized.

In order to safely and easily load a drum 24a onto the carrier tray 20, the cart 10 is tiltable between a generally horizontal "use" or "carry" position (FIGS. 1 and 2) and a generally vertical "loading" position (FIG. 3). That is, a user can hold the handles 18 (and the feet 16 as well if preferred) and tilt the cart 10 onto the front wall 20c of the carrier tray such that the front wall 20c lies substantially flat onto the underlying surface. In the vertical position, a standing vertical drum 24a may be pushed to slide over the front wall 20c and rest against the tray base 20a. The slightly obtuse angle between the front wall 20c and the tray base 20a allows the front wall 20c to act as a ramp for sliding the drum 24a thereon. The angle also mitigates tipping over of the cart 10 in the vertical position, and substantially stabilizes the cart 10 to remain in the vertical position unassisted. Then the securing means 22 is engaged to secure the vertical drum 24a in place.

If a user wishes to load two drums 24a, a second drum 24a may be placed in the carrier tray 20 in the same manner. Then the cart 10 may be tilted back to the horizontal position for transporting and/or using the drum 24a. Thereafter, a user may lift the cart 10 from the handles 18 enough to distance the feet 16 from the underlying ground surface while the rear wheels 14 remain on the ground surface, such that a user may pull or push the cart 10. A box 24b may be loaded in the same manner. However, as a box 24b is lighter, a box 24b may simply be picked up and placed into the carrier tray 20 while the cart 10 is in the horizontal position. One advantage of tilting the cart 10 into a vertical position is that a drum 24a, such as a 150 lb. adhesive drum, can simply be pushed into the carrier tray 20. This avoids the safety hazard associated with lifting and placing a heavy object into the carrier tray 20. This also avoids the need for utilizing machinery to lift the drum and place it in the cart 10. Once loaded onto the cart 10, one advantage of the cart 10 is an easier transportation of the drum 24a and/or box 24b to an upper level of a structure or the roof thereof The cart 10 is also configured to releasably carry and transport a portable mixer and dispenser 26. The dispenser 26 is fluidly coupled to the drum 24a and/or the box 24b, and is necessary for properly dispensing the contents therein. For example, without limitation, the dispenser 26 may be a Reactor E-8p portable electric foam sprayer sold by Graco Inc.

Figure 4:
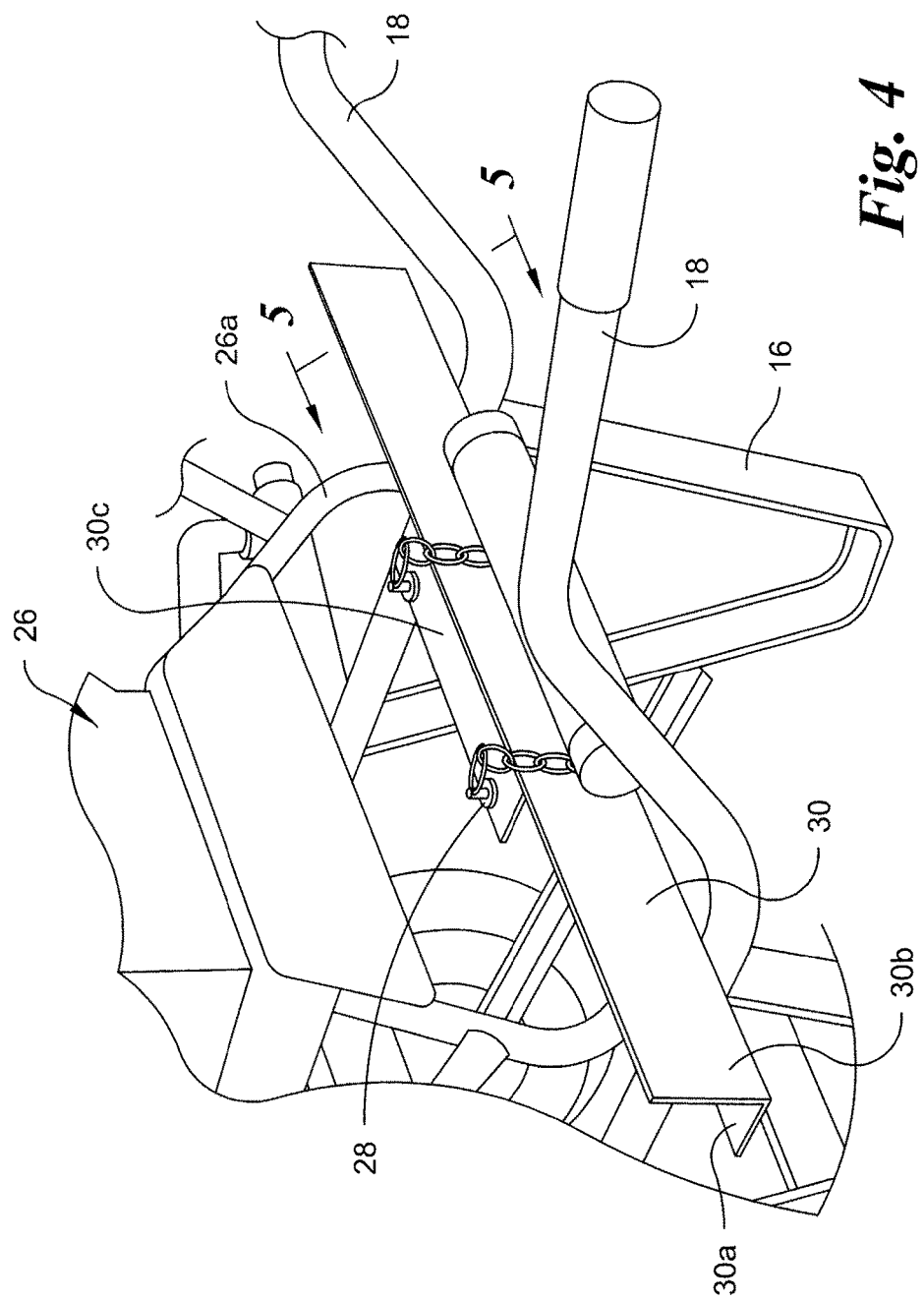
FIG. 4 is a greatly enlarged fragmentary perspective view of the mobile cart of FIG. 1, showing a quick connection between the dispenser frame and the cart frame.

As shown in FIGS. 1-3, the portable dispenser 26 is mountable atop, and supported by, the upper cart frame member 12a, adjacent the handles 18. The distance between the sidewalls of the upper cart frame member 12a is dimensioned to be shorter than the length of a standard portable tubular dispenser frame 26a. Thus a portable dispenser 26, having a tubular dispenser frame 26a is mountable across the upper cart frame member 12a, as shown best in FIG. 2. The portable dispenser 26 is releasably securable to the frame member 12a via a quick connect 28. As shown in FIG. 4, an L-shaped bracket 30 extends across, and is secured to, the left and right side bars of the upper cart frame member 12a, adjacent the handles 18. The base member 30a of the bracket 30 lays flat on the frame member 12a, and the side member 30b of the bracket 30 projects generally perpendicularly upwardly from the base member 30a. The bracket 30 also includes an approximately central top flange 30c, extending from the top of the side member 30b, parallel to the base member 30a.

Figure 6:
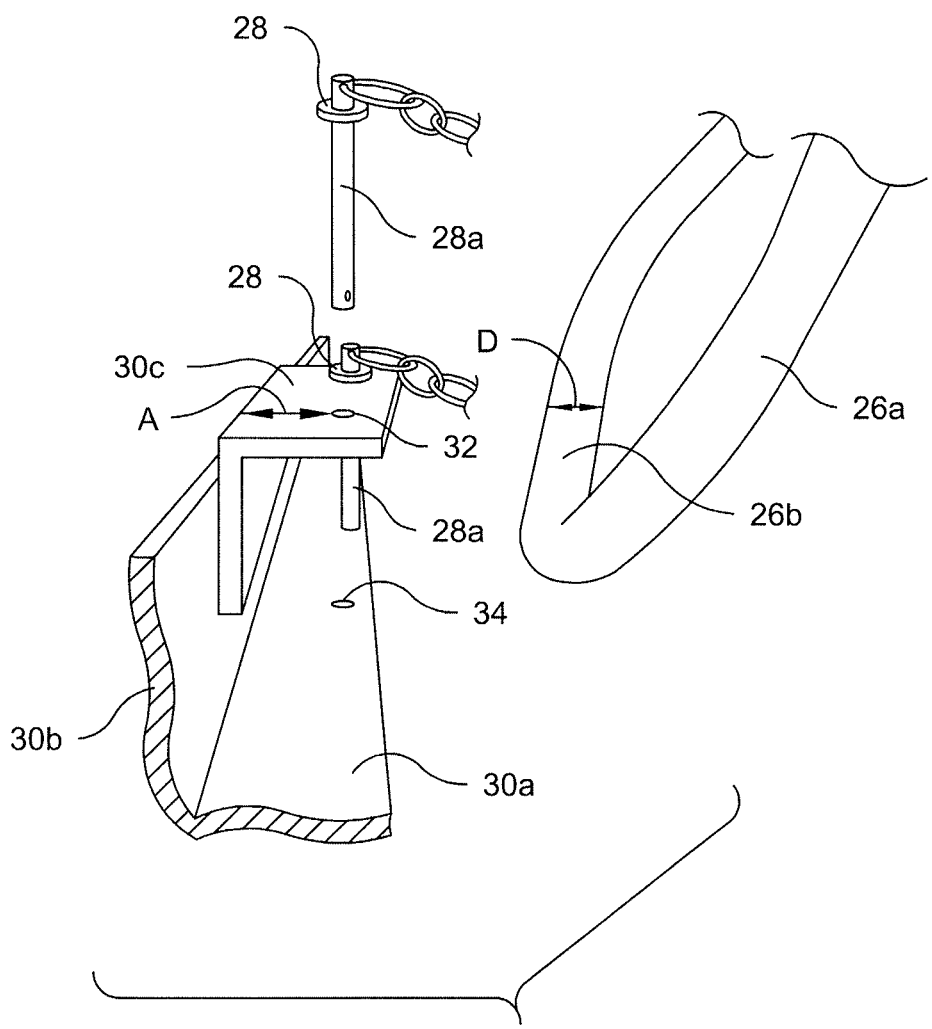
FIG. 6 is a greatly enlarged cross-sectional exploded perspective view of the quick connection between the dispenser frame and the cart frame taken along line 5-5 of FIG. 4.

As shown in FIG. 6, the top flange 30c includes at least one aperture 32 therein. In the illustrated embodiment, the top flange 30c includes two upper apertures 32 laterally spaced from one another. However, as should be understood, the flange 30c may include more than two apertures.

The base member 30a of the bracket 30 also includes a corresponding number of lower apertures 34, vertically aligned with the respective upper apertures 32. In the illustrated embodiment, as shown in FIGS. 5 and 6, the quick connect 28 includes a corresponding number of detent pins 28a as there are upper apertures 32.

Figure 5:
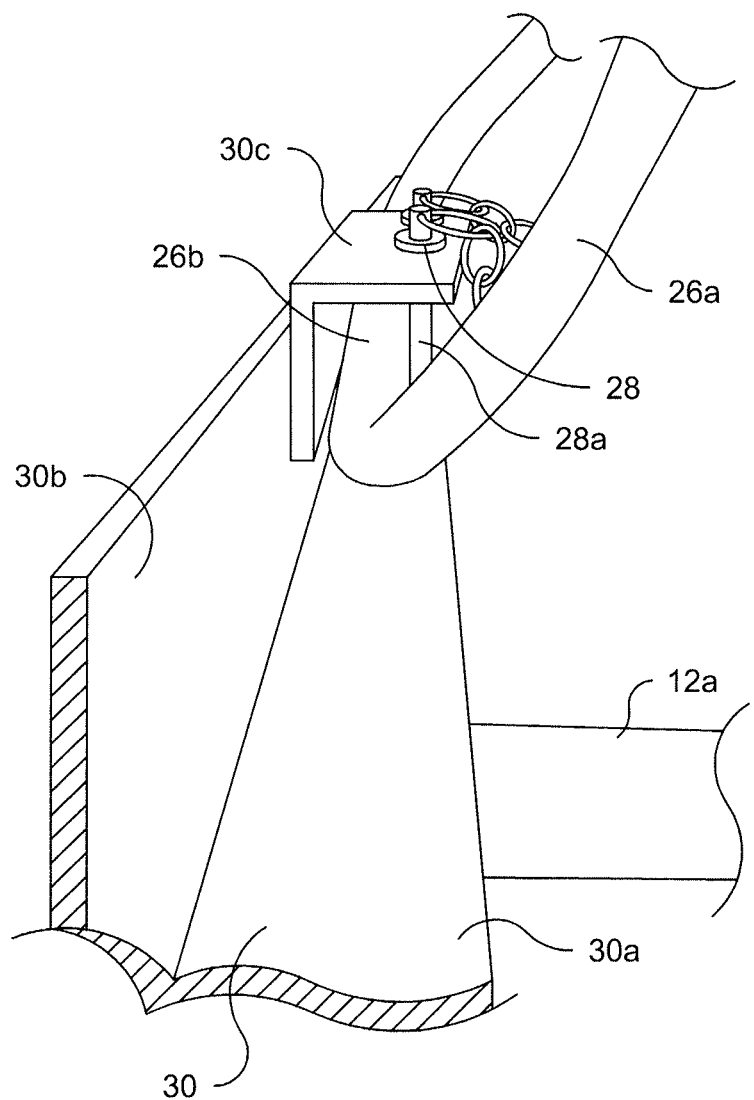
FIG. 5 is a greatly enlarged cross-sectional view of the quick connection between the dispenser frame and the cart frame taken along line 5-5 of FIG. 4.

As shown in FIG. 5, the dispenser 26 is rested atop the frame member 12a such that a side bar 26b of the dispenser frame 26a extends along the base member 30a of the bracket 30. The side member 30b of the bracket 30 prevents the dispenser 26 from sliding rearward (i.e., toward the handles 18). The upper and lower apertures 32 and 34 are positioned along the flange 30c and the base member 30a, respectively, such that the distance A between the upper and lower apertures 32, 34 and the side member 30b of the bracket 30 is greater than the diameter D of the tubular dispenser frame (FIG. 6). Thus, when the side bar 26b of the dispenser frame 26a is rested against the side member 30b of the bracket 30, the detents pins 28a can be projected through the upper apertures 32, clear the dispenser frame 26a, and continue through the corresponding lower apertures 34. The dispenser frame 26 is then attached/connected to the cart 10. Alternatively, the side bar 26b of the dispenser frame 26a may also include corresponding apertures, such that the detent pins 28a extend through the side bar 26b as well. As should be understood by those of ordinary skill in the art, a ball and detent in the respective pins 28a prevents the pins 28a from inadvertently slipping out of the upper and lower apertures 32 and 34.

To detach/disconnect the dispenser 26 from the cart 10, the pins 28a are manually removable from the upper and lower apertures 32, 34. As should be understood by those of ordinary skill in the art, however, any of numerous different quick connect and disconnect means, capable of performing the quick connection and disconnection of the dispenser 26 to and from the cart 10 as described herein, may be utilized. For example, any of numerous different locking members may be utilized to lock and unlock the dispenser frame 26a into and from the bracket 30 or other parts of the upper frame 12a.

Referring now to FIGS. 2 and 3, as should be understood by those of ordinary skill in the art, the dispenser 26 includes standard connections 36 for connecting the dispenser 26 to both drums 24a or boxes 24b (FIGS. 1-3). As also should be understood, the contents in the drums 24a and/or the boxes 24b are gravity fed through the connection lines and into the dispenser 26 due to the internal gravimetric pressure within the drums and/or boxes.

In use, the dispenser 26 can be carried and transported by the cart 10, along with the drums 24a and/or boxes 24b, to a work site. A user typically leaves the dispenser 26 on the cart 10 while dispensing the contents from the drum 24a and/or box 24b through the dispenser 26. Alternatively, if desired or required, a user may quickly disconnect and remove the dispenser 26 from the cart 10. After completing a job, a user may reconnect the dispenser 26 to the cart 10 for easy transportation thereof.

For some applications, an air compressor 38 is beneficial in conjunction with the dispenser 26. Thus, in some embodiments, the cart 10 further includes an air compressor 38 located beneath the dispenser 26, secured atop the planar support member 16a between the feet 16 (only shown in FIG. 1). The air compressor 38 is fluidly connectable to the dispenser 26 in a manner well understood by those of ordinary skill in the art. For some applications, such as, for example, to spray adhesive or spray foam being dispensed from the dispenser 26, a static mixing gun is also required. Accordingly, in some embodiments, the cart 10 further includes a mixing gun 40 fluidly connected to the dispenser 26 (FIG. 1).

It will be appreciated by those skilled in the art that changes could be made to the embodiments described above without departing from the broad inventive concept thereof. It is understood, therefore, that this invention is not limited to the particular embodiment disclosed, but is intended to cover modifications within the spirit and scope of the present invention as defined by the appended claims.

We claim:
1. A mobile cart comprising:
a cart frame;
a pair of wheels rotatably attached to the frame adjacent a front end thereof;
a pair of feet spaced rearwardly from the wheels and projecting downwardly from the cart frame for engaging an underlying supporting surface;
a carrier tray fixedly secured atop, and supported by, the cart frame, the carrier tray having a generally planar tray base, two opposing side walls extending upwardly from the tray base and a non-movable front wall extending between the side walls and upwardly from a front end of the tray base, wherein the tray base, side walls and the front wall define a cavity therebetween the front wall of the carrier tray extending from the tray base at a fixed angle;
a first container positioned in the cavity, containing a first material;
a second container positioned in the cavity, containing a second material; and
a combination mixer and dispenser releasably secured to the cart frame and releasably fluidly coupled to the first and second containers for mixing and dispensing the first and second materials;
wherein the cart is tiltable between a generally horizontal position and a generally vertical position relative to the underlying support surface, the front wall of the carrier tray being angled from the tray base such that the front wall lies against the underlying support surface in the generally vertical position and stabilizes the cart for loading and unloading of the containers, and the wheels supporting the cart above the underlying support surface when the cart is tilted into the generally horizontal position.

2. The mobile cart according to claim 1, wherein the cart frame includes a generally rectangular upper cart frame member and a generally rectangular lower cart frame member located beneath, and spaced from, the upper cart frame member, the upper and lower cart frame members being fixedly connected together at a front end thereof via a pair of axial cart frame members, and the pair of wheels being rotatably attached to the front end of the lower cart frame member.

3. The mobile cart according to claim 2, wherein the pair of feet extend downwardly from the upper cart frame member to an approximately even elevational level with a bottom of the pair of wheels, and a rear end of the lower cart frame member is securely connected to the feet.

4. The mobile cart according to claim 2, wherein opposing side bars of the upper cart frame member extend rearwardly to form a pair of cart handles.

5. The mobile cart according to claim 1, wherein each of the feet define a generally trapezoidal shape.

6. The mobile cart of claim 5, wherein the pair of feet further include a generally planer support member extending between lower bases thereof, for engaging the underlying support surface when the cart is oriented in the generally horizontal position.

7. The mobile cart of claim 1, wherein the front wall of the carrier tray extends from the tray base at an obtuse angle.

8. The mobile cart of claim 1, wherein each of the first and second containers is one of a 15 gallon drum and a 5 gallon bag-in-a-box.

9. The mobile cart of claim 1, further comprising at least one elastic band for strapping around at least one of the first and second containers and latching onto the carrier tray, for securing the at least one of the first and second containers in the carrier tray.

10. The mobile cart of claim 1, further comprising an air compressor secured to the cart frame, and fluidly coupled to the combination mixer and dispenser.

11. The mobile cart of claim 1, further comprising a mixing gun fluidly connected to the combination mixer and dispenser.

* * * * *